A. G. M. PANSA.
AUTOMOBILE SIGNALING DEVICE.
APPLICATION FILED FEB. 11, 1921.

1,382,929.

Patented June 28, 1921.
2 SHEETS—SHEET 1.

INVENTOR
Andrea Gabriele Michele Pansa
By Chas. H. Luther
ATTORNEY

A. G. M. PANSA.
AUTOMOBILE SIGNALING DEVICE.
APPLICATION FILED FEB. 11, 1921.
1,382,929.
Patented June 28, 1921.
2 SHEETS—SHEET 2.
Fig. 4.
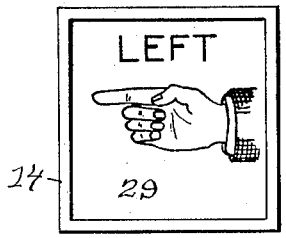
Fig. 5.
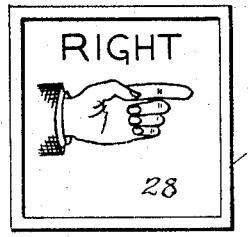
Fig. 6.
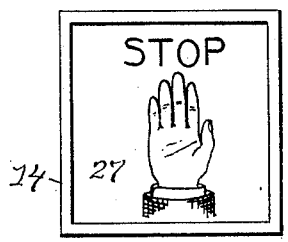
Fig. 7.
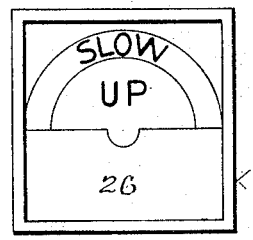
Fig. 8.
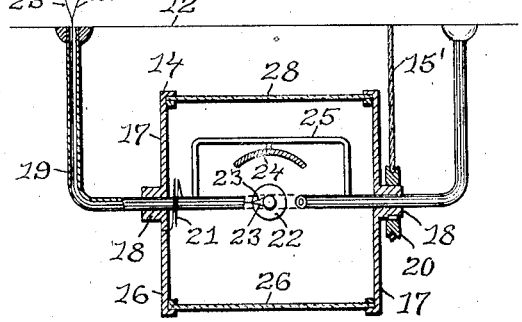
Fig. 9.
Fig. 10.
INVENTOR:
Andrea Gabriele Michele Pansa
by Chas. H. Luther
ATTORNEY.

UNITED STATES PATENT OFFICE.

ANDREA GABRIELE MICHELE PANSA, OF BRISTOL, RHODE ISLAND.

AUTOMOBILE SIGNALING DEVICE.

1,382,929.  Specification of Letters Patent.  Patented June 28, 1921.

Application filed February 11, 1921. Serial No. 444,151.

*To all whom it may concern:*

Be it known that I, ANDREA GABRIELE MICHELE PANSA, a citizen of Italy, residing at Bristol, in the county of Bristol and State of Rhode Island, have invented a new and useful Improvement in Automobile Signaling Devices, of which the following is a specification.

In the use of automobiles having no signaling device, it is a common, crude and awkward practice for the driver to hold out his arm to indicate that he intends to stop and to point with his hand to the right or left to show in which direction he intends to go, when approaching a main or cross street.

The object of my invention is to provide an automobile with a signaling device having a slow up, stop and right and left hand direction indicator at the rear of the automobile and operated from the instrument board by the driver, at a minimum effort and loss of time.

Further objects of my invention are to simplify the construction and operation, and reduce the cost of manufacturing such a signaling device for automobiles.

My invention consists in the peculiar and novel construction of a signaling device for automobiles, said signaling device having a slow up, stop and right and left hand direction signals, in one device at the back of the automobile and operated from the instrument board at the front, said signaling device having details of construction as will be more fully set forth hereinafter and claimed.

Fig. 4 is a face view of the left direction indicator.

Fig. 5 is a face view of the right direction indicator.

Fig. 6 is a face view of the stop indicator.

Fig. 7 is a face view of the slow up indicator.

Fig. 8 is a horizontal section view through the signaling device, taken on line 8, 8, of Fig. 2.

Fig. 9 is a face view, partly in section, of the signaling device controller, and Fig. 10 is a sectional view through the controller, taken on line 10, 10 of Fig. 9.

Figure 3:
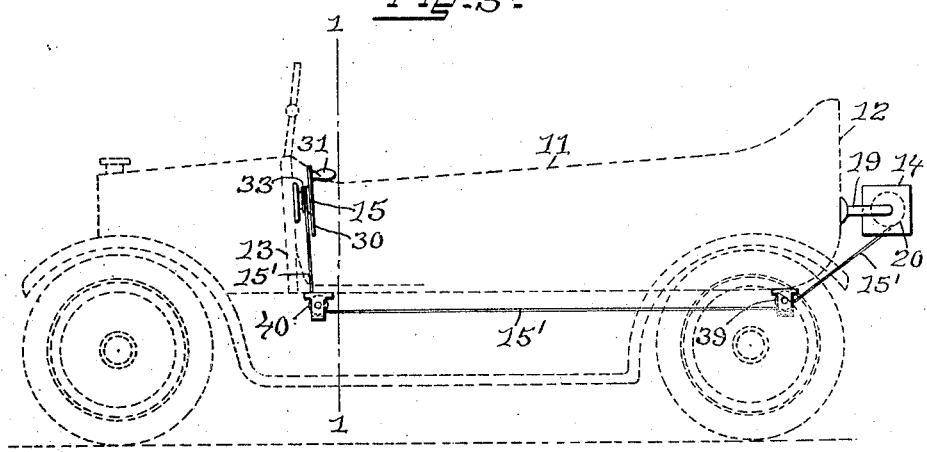
Fig. 3 is a diagrammatic side view illustrating the layout of the signaling device in full lines and indicating a side view of the automobile in broken lines.

In the drawings 11 indicates an automobile having the usual rear body end 12 and forward instrument board 13; 14 a signaling device on the rear body end 12 operatively connected to a controller 15 on the instrument board 13, by preferably a small wire rope 15', as shown in Fig. 3.

The signaling device 14 consists of a preferably square box 16 having closed ends 17, 17 with bearings 18, 18 rotatably supporting the box on a U shaped tubular frame 19, the ends of which are secured to the rear body end 12 of the automobile. A grooved pulley 20 is secured on one of the bearings 18 and the rear end of the wire rope 15' is secured to and wound on the pulley. A coiled spring 21 around the frame 19 is secured at one end to an end 17 of the box and at the other end to the frame 19. An electric lamp 22 is centrally suspended in the box from the frame 19 and wires 23, 23 electrically connects the lamp, through one arm of the tubular frame 19, to the usual source of electric energy, not shown. A reflector 24 is centrally fixed back of the lamp, to a frame 25 which is secured to the frame 19, as shown in Fig. 8. The normal front 26, top 27, back 28 and bottom 29 of the box are of glass, each in turn forming the front of the signaling device. The normal front 26 has the words, Slow up, as shown in Fig. 7, the top 27 has the word Stop with an illustration of a hand pointing upward, as shown in Fig. 6, the back 28 has the work Right with an illustration of a hand pointing to the right, as shown in Fig. 5 and the bottom 29 has the word Left and the illustration of a hand pointing to the left, as shown in Fig. 4. The controller 15 is in the form of a flat disk 30 having an operating handle 31, V shaped peripheral notches 32, 32, a grooved pulley 33 on the back of the disk 30 and the disk 30 is rotatably supported on a stud 34 on a frame 35 which is secured to the instrument board 13. The frame 35 also has a radial boss 36 in which is a spring operated latch 37 having a V shaped end 38 which enters a notch 32 in the disk 30 and holds the disk 30 and signaling device 14 in the set signaling position under spring tension. The V shaped notches in the disk are indicated by the words Slow up, Stop, Right and Left. The wire rope 15' extends from the pulley 20 down and under a pulley 39, under the body of the automobile then under a pulley 40, then upward, as shown in Fig. 3, the forward end being secured to and wound around the pulley 33 on the controller 15.

Figure 1:
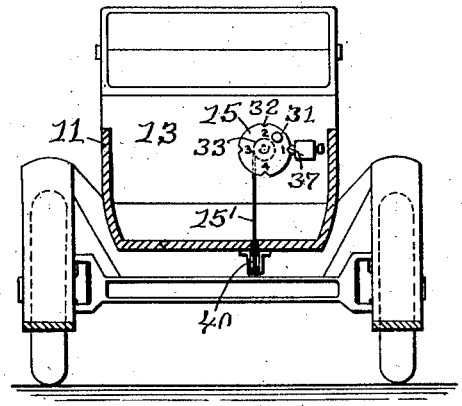
Figure 1 is a vertical transverse sectional view through an automobile looking forward and showing my improved controller on the instrument board for operating my signaling device.
Figure 2:
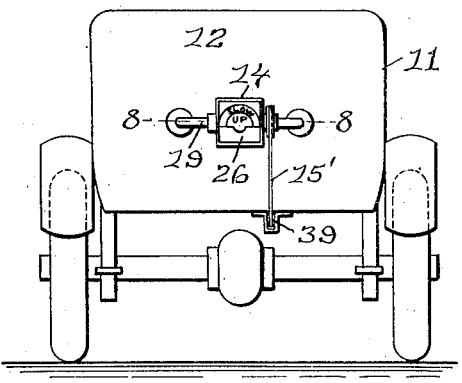
Fig. 2 is a rear end view showing my signaling device on the rear end of the automobile.

When in use and in the normal position, the slow up indicator, shows at the back of the automobile, as shown in Fig. 2. When an automobile coming from the rear is near enough to read this sign, either in the day time, or when it is lighted at night, he is informed that he must slow up, to be safe. When the driver intends to stop, he operates the controller 15, on the instrument board 13, by the handle 31 to move the stop notch 32, in the direction of the arrow 41, to engage with the latch 37. This winds the rope 15' up on the pulley 33 on the controller 15 and unwinds it from the pulley 20 on the signaling device 14 at the rear, rotating the same over one quarter of a revolution and bringing the slow up indicator, as shown in Fig. 7, onto and now forming the front 26. The signals stop, right and left are brought over and around to the front of the device in the same way, against the tension of the spring 21, the tension of which revolves the device back to its normal position, when the slow up notch 32 is turned back to the spring latch 37. The electric lamp 22 and reflector 24 are stationary.

It is evident that the signaling device 14 could be recessed into the rear end of the automobile and other details of construction could be varied, within the scope of the appended claim.

Having thus described my invention I claim as new:—

In an automobile signaling device the combination of the following instrumentalities, a square box shaped signaling indicator having glass sides on which are means for signaling, a tubular U shaped frame on the body of the automobile, at the rear, means for rotatably securing the indicator to the U shaped frame, spring means connecting the indicator with the U shaped frame to rotate the indicator in a reverse direction, a reflector on the U shaped frame, a lamp secured to the U shaped frame in front of the reflector, and means for operating the signaling indicator, all for the purpose as described.

In testimony whereof, I have signed my name to this specification.

ANDREA GABRIELE MICHELE PANSA.